Patented Apr. 27, 1948

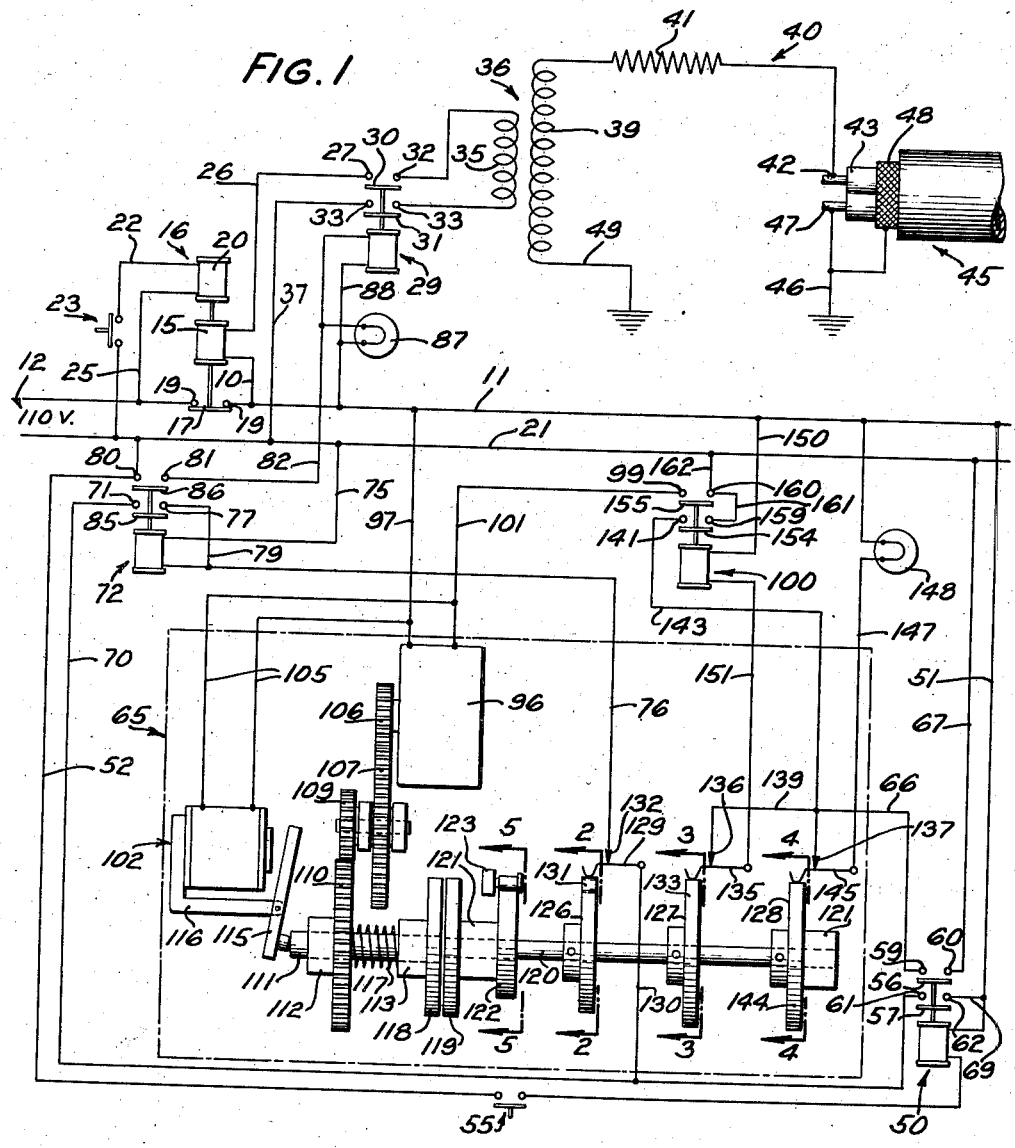

2,440,480

UNITED STATES PATENT OFFICE 2,440,480

ELECTRICAL INSULATION TESTING APPARATUS

Clay E. Lewis, Baltimore, Md., assignor to Western Electric Company, Incorporated, New York, N. Y., a corporation of New York Application March 31, 1944, Serial No. 528,823

8 Claims. (Cl. 175—183)

This invention relates to testing apparatus and more particularly to apparatus for testing the insulation of electrical conductors.

It is necessary to test the insulation of some types of electrical conductors for minimum periods of time. In such testing operations with testing apparatus heretofore known, it has been necessary for an operator thereof to time the period of each test by ordinary chronological means and thus the attention of the operator is diverted from other duties required in the testing operations. In addition, there was a tendency for the operator to shorten the testing periods below the minimum periods required.

An object of the invention is to provide new and improved testing apparatus.

One device embodying the invention comprises a testing circuit and means for controlling the operation of the circuit, including a starting switch, a timing unit having a synchronous motor drive with a high speed reset-to-zero mechanism associated therewith and also having a plurality of contacts opened thereby at predetermined different intervals, and a plurality of relays associated with the timer and the starting switch and which operate in such sequence that, when the starting switch is actuated, the timer is started and the testing circuit is energized, the relays and timers being so designed that, after the timer has been placed into operation, it continues to operate for a predetermined period regardless of whether the starting switch is closed.

A complete understanding of the invention may be obtained from the following detailed description of a specific embodiment thereof, when read in conjunction with the appended drawings, in which Fig. 1 illustrates schematically a portion of a device embodying the invention;

Fig. 2 is a vertical, sectional view of a portion of the device taken along line 2—2 of Fig. 1;

Fig. 3 is a sectional view of a portion of the device taken along line 3—3 of Fig. 1;

Fig. 4 is a vertical, sectional view of a portion of the device taken along line 4—4 of Fig. 1, and Fig. 5 is a vertical, sectional view of a portion of the device taken along line 5—5 of Fig. 1.

Referring to the drawings, a conductor 10 (Fig. 1) leading from a conductor 11 of a power line 12 connects a sensitive coil 15 of a relay 16 to the conductor 11. A contactor 17 of the relay 16 serves to bridge contacts 19—19 of the conductor 11. A second coil 20 of the relay 16 is connected to a conductor 21 of the power line 12 by a conductor 22 having a normally open manually operated switch 23 therein. A conductor 25 connects the conductor 11 to the coil 20.

A conductor 26 (Fig. 1) connects the other side of the coil 15 to a contact 27 of a relay 29. The relay 29 includes contactors 30 and 31 which, when closed, are adapted to bridge the contact 27 and a contact 32 and contacts 33—33, respectively, to supply power to a primary winding 35 of a step-up transformer 36. A conductor 37 is connected to one of the contacts 33 and to the conductor 21.

The transformer 36 (Fig. 1) includes a secondary winding 39 which is also included in a testing circuit 40. The testing circuit 40 includes a resistance 41 connected to a conductor 42, which has an insulating cover 43 thereon, of a cable 45 to be tested and a grounded conductor 46, which is connected to a second conductor 47 and a metallic braid 48 of the cable 45. A conductor 49 grounds one side of the secondary winding 39.

A relay 50 (Fig. 1) is supplied power from the conductor 11 through a conductor 51 and from the conductor 21 through a conductor 52 which includes a manually operated switch 55 which is open when the device is not in operation. When the switch 55 is closed, the relay 50 is energized to force contactors 56 and 57 thereof into bridging engagement with contacts 59 and 60, and 61 and 62, respectively. The contact 59 is connected to a timer 65 by a conductor 66 and the contact 60 is connected to the conductor 21 by a conductor 67. The contact 62 is connected to the conductor 51 by a conductor 69.

The contact 61 (Fig. 1) is connected to a conductor 70 which is connected to a contact 71 of a relay 72. The coil of the relay 72 is connected to the conductor 21 by a conductor 75 and to the timer 65 by a conductor 76. A contact 77 of the relay 72 is connected to the conductor 76 by a conductor 79. The relay 72 also includes contacts 80 and 81 and the contact 80 is connected to the conductor 52 while the contact 81 is connected to the coil of the relay 29 by a conductor 82. When the relay 72 is energized, contactors 85 and 86 thereof bridge the contacts 71 and 77, and 80 and 81, respectively, to energize the coil of the relay 29, which is connected to the conductor 11 by a conductor 88, and an indicating lamp 87 connected in parallel with the coil of the relay 29.

The winding of a motor 96 (Fig. 1) of the timer 65 is connected to the conductor 11 by a conductor 97 and to a contact 99 of a relay 100 by a conductor 101 and the winding of an electromagnet 102 is connected to the conductors 97 and 101 by conductors 105—105. When in operation, the motor 96 rotates a gear 106 which rotates a gear 107 and thereby rotates a pair of intermeshed gears 109 and 110. Thus, a shaft 111 in which the gear 110 is secured and which is slidably mounted in bearings 112 and 113, is rotated.

An armature 115 (Fig. 1) of the electromagnet 102 is pivotally mounted on an arm 116 of the electromagnet and is pivoted in a counterclockwise direction, as seen in Fig. 1, when the coil of the electromagnet 102 is energized, thus urging the shaft 111 to the right against the action of a coil spring 117 mounted between the gear 110 and the bearing 113. A driving clutch disc 118 secured to the shaft 111 is moved thereby into engagement with a driven clutch disc 119 secured to a shaft 120 rotatably mounted in bearings 121—121. When the electromagnet 102 is deenergized, the spring 117 moves the clutch disc 118 out of engagement with the clutch disc 119 and a return spring 122 (Figs. 1 and 5) of a conventional type serves to urge the shaft 120 back to its original starting position. The inner end of the return spring 122 (Fig. 5) is secured to the shaft 120 and the outer end thereof is secured to a fixed member 123. Thus, a dog 124 secured to the shaft 120 is urged into engagement with a stop 125 when the clutch discs 118 and 119 are out of engagement, and, when the shaft 120 is at rest, it will be held in the position shown in Fig. 5.

Three cams 126, 127 and 128 (Figs. 1, 2, 3 and 4) are adjustably secured to the shaft 120. A contactor 129 connected to the conductor 70 by a conductor 130 bears against a lobe 131 (Fig. 2) of the cam 126, and the lobe 131 forces the contactor 129 into engagement with a contact 132 when the motor 96 is deenergized and the shaft 120 is in its starting position, as shown in the drawings. The contact 132 is connected to the conductor 76 and thus the conductor 76 is electrically connected to the conductor 70 by the conductor 130 when the contact 132 and the contactor 129 are in engagement. When the cam 126 is rotated in a clockwise direction, as shown in Fig. 2, the lobe 131 is moved past the contactor 129 to break the connection between the contactor 129 and the contact 132 which breaks the connection between the conductor 76 and the conductor 70. The connection between the contact 132 and the contactor 129 is broken at all times except when the contactor 129 is in engagement with the lobe 131 of the cam 126.

A periphery 133 of the cam 127, when in its starting position, as shown in Fig. 3, serves to force a contactor 135 into engagement with a contact 136. When the cam 127 has been rotated clockwise, as shown in Fig. 3, to a position in which a dwell 134 of the cam 127 engages the contactor 135 the engagement between the contactor 135 and the contact 136 is broken. Except when in engagement with the dwell 134 of the cam 127, the contactor 135 is forced by the periphery 133 of the cam 127 into engagement with the contact 136.

The contact 136 is connected to a contact 137 (Fig. 1) by a conductor 139 and the conductor 139 and the contact 137 are connected to the contact 59 by the conductor 66. The contact 137 and the conductors 139 and 66 are connected to a contact 141 of the relay 100 by a conductor 143.

A periphery 144 of the cam 128, when in its starting position, as shown in Fig. 4, forces a contactor 145 into engagement with the contact 137. After the cam 128 has been rotated in a clockwise direction so that a dwell 146 thereof engages the contact 145, the engagement between the contactor 145 and the contact 137 will be broken, but it is only at that time that the engagement therebetween is broken. The contactor 145 is connected to the conductor 11 by a conductor 147 (Fig. 1) with an indicating lamp 148 in series therewith.

The coil of the relay 100 (Fig. 1) is connected to the conductor 11 and the contactor 135 by conductors 150 and 151, respectively. When the relay 100 is energized, it forces a contactor 154 thereof against the contact 141 and a contact 159 and a contactor 155 thereof against a contact 160 and the contact 99. The contacts 159 and 160 are connected by a conductor 161 and a conductor 162 connects the contact 160 to the conductor 21.

In the operation of the device described hereinabove, the cable 45 is placed in the testing circuit 40, as described hereinabove, and the switch 55 is closed. At this time, the cams 126, 127 and 128 are in the position shown in the drawings, that is, in their starting positions. After the switch 55 is closed, the relay 50 is energized and the contacts 61 and 62 are bridged by the contactor 57 and the contacts 59 and 60 are bridged by the contactor 56. When the contactor 57 bridges the contacts 61 and 62, the conductor 69 is connected to the conductors 70 and 130 to energize the relay 72 through a circuit including the conductor 75, the coil of the relay 72, the conductor 76, the contact 132, the contactor 129, the conductor 130, the conductor 70, the contact 61, the contactor 57, the contact 62, and the conductors 69 and 51. The energized relay 72 then forces the contactor 86 into engagement with the contacts 80 and 81 and the contactor 85 into engagement with the contacts 71 and 77. When the contactor 85 bridges the contacts 71 and 77, the relay 72 is energized by the conductor 75, the conductors 76 and 79, the contact 77, the contactor 85, the contact 71, the conductor 70, the contact 61, the contactor 57, the contact 62 and the conductors 69 and 51.

When the contactor 86 bridges the contacts 80 and 81, the coil of the relay 29 is energized to force the contactors 30 and 31 against the contacts 27 and 32, and 33—33, respectively, whereby the primary winding 35 of the transformer 36 is energized, which fact is indicated by the illumination of the lamp 87. However, if the insulating cover 43 on the conductor 42 is not defective, there will be very little current passing through the circuit 40, and therefore very little current passing through the circuit including the primary winding 35 of the transformer 36 and the sensitive coil 15 of the relay 16, and the coil 15 will not be energized sufficiently to force the contactor 17 of the relay 16 away from the contacts 19—19. The contactor 17 will then remain in engagement with the contacts 19—19 and the illumination of the lamp 87 will indicate that the insulating cover 43 of the conductor 42 has not yet been found faulty and that the test is being continued.

Assuming that the insulating cover 43 of the conductor 42 is not faulty, when the contactor 56 is forced into engagement with the contacts 59 and 60, as described hereinabove, the lamp 148 is illuminated to indicate the operation of the timer 65 and a circuit is completed from the conductor 11 through the conductor 150, the coil of the relay 100, the conductor 151, the contactor 135, which is pressed by the periphery 133 of the cam 127 against the contact 136, the contact 136, the conductors 139 and 66, the contact 59, the contactor 56, the contact 60 and the conductor 67 to the conductor 21, whereby the relay 100 is energized. The energization of the relay 100 forces the contactor 155 into engagement with the contacts 99 and 160, and the contactor 154 into engagement with the contacts 141 and 159. When the contactor 155 bridges the contacts 99 and 160, the relay 100 receives power from the conductor 21 through the conductors 162 and 161, the contact 159, the contactor 154, the contact 141, the conductors 143 and 139, contact 136, contactor 135, and the conductor 151, and from the conductor 11 through the conductor 150. Thus, the contactors 154 and 155 will be retained in engagement with their respective contacts as long as the engagement between the contactor 135 and the contact 136 is maintained, even if the relay 50 should be deenergized by the opening of the switch 55.

When the contactor 155 of the relay 100 bridges the contacts 99 and 160, a circuit is completed from the power line 12 through the conductors 11 and 97, the motor 96, the conductor 101, the contact 99, the contactor 155, the contact 160, and the conductors 162 and 21, thus starting the motor 96. The motor 96 drives the gear 110 at a uniform, slow rate of speed through the gears 106, 107 and 109 to rotate the shaft 111 and the clutch disc 118 secured thereto. Simultaneously, the electromagnet 102 is energized, thereby forcing the shaft 111 to the right, as viewed in Fig. 1, to force the driving clutch disc 118 into engagement with the driven clutch disc 119 and the shaft 120 and the cams 126, 127 and 128 secured thereto are thereby rotated in clockwise directions, as viewed in Figs. 2, 3 and 4, against the action of the return spring 122. The speed of the motor 96 and the ratios of the gears 106, 107, 109 and 110 are such that the shaft 120 is rotated through the major portion of a circle in a period of time slightly over one minute. This period of time is slightly greater than the minimum period of time through which the insulating cover 43 should be tested, which period of time is approximately one minute. If the lamp 87 remains lighted, indicating that only a small current is passing through the testing circuit 40, the switch 55 should be kept closed by the operator to continue the test, and if it is kept closed, the lamp 87 remains illuminated to indicate that fact.

When the lobe 131 (Fig. 2) of the cam 126 is rotated past the contactor 129 a few seconds after the start of the testing operation initiated by the closing of the switch 55 (Fig. 1), the engagement between the contactor 129 and the contact 132 is broken. However, the breaking of the engagement between the contactor 129 and the contact 132 does not deenergize the relay 72 if the switch 55 is closed, because the circuit from the power line 12 through the conductors 21 and 75, the coil of the relay 72, the conductors 76 and 79, the contact 77, the contactor 85, the contact 71, the conductor 70, the contact 61, the contactor 57, the contact 62, and the conductors 69, 51 and 11 remains closed as long as the switch 55 is not opened by the operator. However, if, at any time thereafter during the test period, the switch 55 is opened, the relay 50 is deenergized, which deenergizes the relay 72, and the relay 72 cannot be energized again until after the timer 65 finishes its cycle and returns to the starting position when the lobe 131 again forces the contactor 129 against the contact 132.

Meanwhile, if the insulating cover on the conductor 42 is free from defects, the shaft 120 continues to be rotated in a clockwise direction, as shown in Fig. 2. Approximately one minute after the switch 55 is closed, the dwell 146 (Fig. 4) of the cam 128 is moved into engagement with the contactor 145, the engagement between the contactor 145 and the contact 137 is broken and the lamp 148 goes out, thereby indicating the transpiration of the minimum test period. The operator then opens the switch 55. However, the contactor 135 is still held by the periphery 133 of the cam 127 (Fig. 3) in engagement with the contact 136, thereby causing the motor 96 and the electromagnet 102 to remain in operation for a few seconds longer, until the dwell 134 of the cam 127 is rotated to a position in engagement with the contactor 135 and the connection between the contactor 135 and the contact 136 is broken thereby. The disengagement of the contactor 135 and the contact 136 deenergizes the relay 100, thereby opening the connections between the contactors 154 and 155 and the contacts 141 and 159, and 99 and 160, respectively, whereby the motor 96 and the electromagnet 102 are deenergized. Upon the deenergization of the electromagnet 102 the spring 117 moves the clutch disc 118 away from the clutch disc 119 and the return spring 122 rotates the shaft 120, the cams 126, 127 and 128, and the dog 124, back to their starting positions, after which a testing operation upon an insulating cover of another conductor similar to the conductor 42 may be conducted. The resetting operation just described occurs quickly and, because of this fact, the resetting operation does not start until ample time after the lamp 148 goes out for the switch 55 to be opened prior to the return to the starting position.

If the switch 55 is maintained closed for the minimum test period, which is indicated by the illumination of the lamp 148, the lamp 87 will remain illuminated during that period. However, if the switch 55 is opened prior to the time that the lamp 148 goes out, the lamp 87 will go out, which, together with the illumination of the lamp 148, will indicate that the test of the conductor 79 is not being conducted the required time. The light 148 will remain illuminated for the minimum test period because the relay 100 will remain energized by the circuit through the conductors 21, 162 and 161, the contact 159, the contactor 154, the contact 141, the conductors 143 and 139, the contact 136, the contactor 135, the conductor 151, the coil of the relay 100, and the conductors 11 and 150, even though the switch 55 has been opened prior to the expiration of the minimum test period. Thus, the contactor 155 will be retained in engagement with the contacts 99 and 160 and the circuit to the motor 96 and the electromagnet 102 will remain closed. Consequently, the cams 126, 127 and 128 will continue to rotate even though the switch 55 is prematurely opened. But, if the switch 55 is opened prematurely after the lobe 131 has moved out of engagement with the contactor 129, reclosing of the switch 55 will not energize the relay 72 and another testing operation cannot be started until the timer 65 has returned to the starting position.

If the insulating cover 43 (Fig. 1) is not indicated to be faulty, but the switch 55 is opened before the lamp 148 goes out, this failure to test the conductor 42 the required period of time may be observed easily by a supervisor, since the lamp 148 is still illuminated but the lamp 87 is not. Also, the above described device reduces any incentive to shorten the period of actual testing, since another testing operation cannot be started after a shortened operation until the contactor 129 is forced into engagement with the contact 132 when the cam 126 is returned to its starting position by the return spring 122, as described hereinabove.

If there is a fault in the insulation of the conductor 42, the resistance of the circuit 40 will be low enough that a high current will pass therethrough, thus causing a greater flow of current through the primary winding 35 of the transformer 36. This surge of current through the primary winding 35 and the coil 15 will energize the coil 15 sufficiently to force the contactor 17 of the relay 16 away from the contacts 19—19 and thereby deenergize the entire device. Thus, the lamps 87 and 148 will go out simultaneously to indicate a defect in the insulating cover 43. If the device is so deenergized, the timer 65 will return to its starting position. The conductor 42 may then be disconnected from the resistance 41 and another conductor similar thereto may be similarly placed in the circuit 40. The switch 23 is then closed to energize the coil 20 which forces the contactor 17 into engagement with the contacts 19—19, the switch 23 opened, and another test may be conducted without loss of time.

The above described device gives an operator thereof free control as to the opening of the high potential circuit 40, but indicates clearly the period which an insulating cover free from defects should be tested and whether such a cover not found defective is actually tested the minimum test period. Any incentive to speed up production at the expense of incomplete tests by shortening the test periods is eliminated by the device described hereinabove because, if a cover under test is not found to be defective, and if the switch 55 has been opened before the expiration of the minimum test period but after the contactor 129 and the contact 132 have been disengaged, the testing circuit 40 cannot be energized by the reclosing of the switch 55 before the timer 65 completes its cycle and is reset. But, if a cover under test is defective, the entire device is immediately deenergized and another testing operation may be started as soon as the conductor having the defective cover thereon is removed and another conductor is inserted in the testing circuit.

What is claimed is:

1. An apparatus for testing an insulating jacket surrounding a conductor forming part of an electric cable, which comprises a testing circuit energizable to impress a high potential across such a conductor connected therein, a low potential control circuit including means for energizing the high potential testing circuit, means for controlling the continuity of the energizing means, manually controlled means for energizing the continuity controlling means to energize the testing circuit and start an insulation testing operation on the conductor connected therein, means operable with the continuity controlling means for indicating when the testing circuit is energized, and timing means started by the manually controlled means for indicating when a testing operation has been conducted on the conductor for a predetermined period of time.

2. An apparatus for electrically testing an insulated conductor for a predetermined period of time, which comprises a testing circuit energizable to impress a high potential across a conductor connected thereacross, means for energizing the testing circuit, means for controlling the continuity of the energizing means, manually controlled means for energizing the continuity controlling means to energize the testing circuit and start a high potential testing operation on a conductor connected therein, timing means started by said manually controlled means for indicating the passage of a predetermined period of time after the start of said testing operation, contacting means controlled by the timer and electrically connected to the manually controlled means for preventing the reenergization of the continuity controlling means during the timing period, means operable by the manually controlled means for simultaneously indicating the energization of the testing circuit and the operation of the timing means during a testing operation, means controlled by the timing means for preventing the interruption of said timing means during the timing period if the conductor being tested is not defective, means responsive to an increase of current flowing in the energizing means for interrupting the timing means and deenergizing the continuity controlling means if the high potential testing operation should break down the insulation of a conductor connected in the testing circuit, and means for resetting the current responsive means to close the energizing means.

3. An apparatus for electrically testing the insulation of an insulated conductor, which comprises a testing circuit energizable to impress a high potential across an insulated conductor connected therein, means for energizing the testing circuit, a relay for controlling the continuity of the energizing means, manually controlled means for energizing the relay to energize the testing circuit and initiate a high potential insulation testing operation on the insulated conductor, means controlled by said manually controlled means for indicating the energization and deenergization of the testing circuit, timing means started by the operation of the manually controlled means for indicating the passage of a predetermined period of time after the initiation of a testing operation by said manually controlled means, and means actuated by the timing means and electrically interlocked with the manually controlled means for preventing the reenergization of said relay after any deenergization thereof effected by a deenergization of the manually controlled means prior to the expiration of the predetermined period of time if a conductor under test is not defective.

4. An apparatus for electrically testing the insulating jacket of an insulated conductor, which comprises a testing circuit energizable to impress a high potential across such a conductor connected therein, means for energizing the testing circuit, means for controlling the continuity of the energizing means, timing means energizable to indicate the passage of a predetermined period of time, resilient means actuated by said timing means during the timing period for automatically resetting said timing means to its starting position upon deenergization thereof, means operable by said timing means for indicating when said period of time has elapsed, means operable with said continuity controlling means for indicating the energization of the testing circuit, manually controlled means for simultaneously energizing the continuity controlling means and the timing means to initiate a high potential testing operation on the insulated conductor connected in said testing circuit, and means controlled by the timing means for maintaining the operation of the timing means independently of the operation of the manually controlled means, whereby if said testing circuit is deenergized during the timing period by the deenergization of the manually controlled means the resetting means is not effective to reset the timing means to its starting position until the timing means has completed its timing period.

5. An apparatus for electrically testing the insulation surrounding a conductor forming part of an electric cable, which comprises a testing circuit energizable to impress a high potential across such a conductor and its insulating jacket, means for energizing the testing circuit, a relay for controlling the continuity of the energizing means, means operable with said relay for indicating the energization thereof, manually controlled means for energizing the relay to energize the testing circuit and start a high potential testing operation on the insulated conductor connected therein, timing means started by said manually controlled means for indicating the passage of a predetermined period of time after the start of a testing operation, means connected in series with the energizing means for indicating when the insulating jacket of the conductor under test breaks down during the high potential testing operation thereon, and means controlled by the timing means for preventing the reenergization of the testing circuit if said testing circuit is manually deenergized before the expiration of the predetermined period of time and the conductor under test is not defective.

6. An apparatus for testing the insulation surrounding the conductor of an electric cable, which comprises a testing circuit energizable to impress a high potential across the insulating jacket of a conductor connected therein, means for energizing the testing circuit, a control circuit for controlling the operation of the testing circuit including means for controlling the continuity of the energizing means, manually controlled means for energizing the continuity controlling means to energize the testing circuit, means to start a high potential testing operation on the conductor connected in the testing circuit, timing means started by the manually controlled means for indicating that a testing operation has been conducted on the conductor for a predetermined period of time, and resilient means actuated by the timing means during a testing operation for instantaneously resetting the timing means to its starting position upon the expiration of the testing operation.

7. An apparatus for conducting a high potential insulation test on an insulated conductor forming part of an electric cable for a fixed period of time, which comprises the combination of a testing circuit energizable to impress a high potential across the insulating jacket of a conductor connected therein and having means associated therewith for energizing the testing circuit and a control circuit including means for controlling the continuity of the energizing means, manually controlled means for selectively operating the continuity controlling means to energize the testing circuit and initiate a high potential testing operation on the insulation of a conductor connected therein, timing means started upon the actuation of the continuity controlling means for indicating the passage of a predetermined period of time after the starting of a testing operation, and means connected in series with the energizing means and responsive to an increase of current flowing therein, whereby if the high potential testing operation breaks down a defect in the insulation of a conductor connected in the testing circuit a high current will flow therein causing an increased current flow in the energizing means and the current responsive relay, which relay will be actuated thereby and deenergize the energizing means and the timing means simultaneously.

8. An apparatus for electrically testing the insulating jacket of a conductor for a fixed period of time, which comprises a stepup transformer, a testing circuit including the secondary winding of the transformer energizable to impress a high potential across the insulating jacket of a conductor connected therein, a power supply, a relay for connecting the primary winding of the transformer to the power supply and energize the testing circuit, a second relay for energizing the first mentioned relay, radiant means for indicating when the first mentioned relay is energized, a third relay for controlling the operation of the second relay, a manually operable switch for energizing or deenergizing the third relay to energize or deenergize the testing circuit at will, a fourth relay energized by the third relay, timing means energized by the fourth relay, means provided on the timing means for maintaining said fourth relay in an energized position, means provided on said fourth relay for maintaining the timer in continuous operation for a predetermined period of time after an actuation of the manually operable switch, said timing means also being provided with contacting means electrically connected with the second relay for preventing the reenergization of the first and second relays prior to the expiration of the predetermined period of time if the insulating jacket of the conductor under test is not defective, a fifth relay having its closing coil connected in series with the primary winding of said transformer and responsive to an increase of current flowing therein for deenergizing the above mentioned relays only if the insulating jacket of a conductor being tested is defective, and resilient means actuated by the timing means for permitting the reenergization of the first and second relays before the expiration of the predetermined period of time if the fifth relay is actuated by the presence of a defective insulating jacket on the conductor connected in the testing circuit.

CLAY E. LEWIS.

REFERENCES CITED

The following references are of record in the file of this patent:

UNITED STATES PATENTS

| Number | Name | Date |
| --- | --- | --- |
| 1,904,598 | Anderson | Apr. 18, 1933 |
| 1,922,792 | Cain | Aug. 15, 1933 |
| 2,157,810 | Bany | May 9, 1939 |
| 2,337,830 | Longwell | Dec. 28, 1943 |